United States Patent [19]

Ritch

[11] Patent Number: 5,328,704
[45] Date of Patent: Jul. 12, 1994

[54] PROCESS OF MAKING AND COOKING FRENCH FRIED POTATOES

[76] Inventor: Avron Ritch, 5 Valleyview Crescent, Edmonton, Alberta, Canada, T5R 5S5

[21] Appl. No.: 882,513

[22] Filed: May 13, 1992

[51] Int. Cl.$^5$ ............................................. A23L 1/216
[52] U.S. Cl. .................................... 426/102; 426/243; 426/302; 426/441; 426/523; 426/524; 426/637
[58] Field of Search ................. 426/87, 102, 107, 113, 426/234, 296, 302, 438, 441, 523, 524, 637, 243; 219/10.55 E

[56] References Cited
U.S. PATENT DOCUMENTS
4,190,757  2/1980  Turpin et al. ................ 219/10.55 E Primary Examiner—Leo B. Tentoni
Attorney, Agent, or Firm—Anthony R. Lambert

[57] ABSTRACT

Microwavable french fries are prepared by with at least one step in which potato strips are treated in a hot water solution containing starch to form a starch layer in the top surface layer of the potato strips, and by subsequent frying and freezing. A box for cooking the microwave french fries includes top, bottom and side panels that have at least one susceptor board substantially covering them. Prepared potato strips are oriented in the box during packing to be parallel and the box opened and the strips spread across the top, bottom and side panels for exposure to microwave radiation. Indicia on the box instruct the method of microwave cooking.

9 Claims, 2 Drawing Sheets

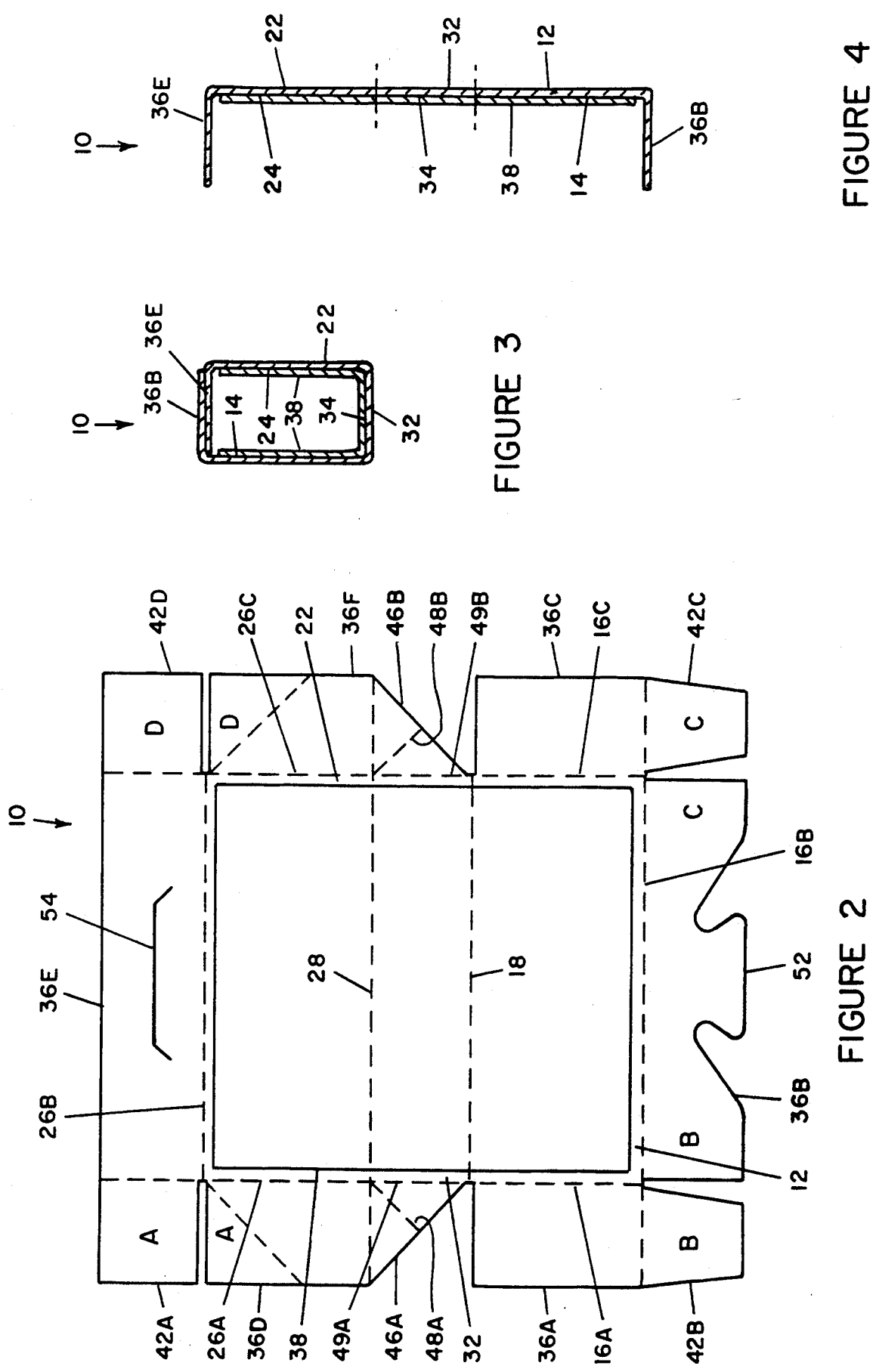

PROCESS OF MAKING AND COOKING FRENCH FRIED POTATOES

FIELD OF THE INVENTION

This invention relates to methods and apparatus for the manufacture and cooking of microwavable french fried potatoes.

BACKGROUND AND SUMMARY OF THE INVENTION

Useful reviews of the art of making satisfactory french fried potatoes that are suited to be cooked ultimately by the consumer by exposure to microwave energy are found in U.S. Pat. No. 4,590,080 of Pinegar, and U.S. Pat. No. 4,931,296 to Shanbhag. Such french fried potatoes will be referred to in this patent document as "microwavable french fries".

Desirable characteristics of microwavable french fries are light crisp outsides, tender mealy insides, a light brown color and a full potato flavour. It has been found difficult to produce satisfactory microwavable french fries, the result being too often too crisp, too soggy or lacking in flavour.

In the Pinegar patent, a method of preparing microwavable french fries is described which includes the step of parfrying potato strips under controlled time and temperature conditions, for example with two parfrying steps with an intermediate cooling step in which the potato strips are frozen to reduce the moisture content of the strips in accordance with a predetermined relationship of strip size, strip surface area and moisture loss during processing.

In the Shanbhag patent, believed to the most successful of the prior art methods, blanched potato strips are dust coated with starch granules derived from potatoes and then fried until the moisture content of the potato strips is from about 20 to 42 per cent by weight, with a final step of cooling of the potato strips.

Both patents teach reduction of water content. In the case of Shanbhag, water content is reduced to 20 to 42% and in the case of Pinegar typical initial water levels of 80% are reduced to about 50%.

While the Shanbhag process is believed to produce the more successful, that is, more palatable, french fry, it does not particularly address fat content. The Shanbhag product has a fat content in the order of 16% to 30% fat, while the Pinegar product has a fat content of between about 7% and 16%.

Boxes useful for cooking microwavable food products are known in the art. Such a box can be found in U.S. Pat. No. 4,590,349 issued May 20, 1986. This box contains a pair of microwave interactive layers one on each of a top panel and a bottom panel of the box. Each of the interactive layers assists in the cooking of foods placed on the layer. Using an interactive layer on each of the top panel and the bottom panel of the box allows the box to be place one way up for a first cooking period and then turned upside down for a second cooking period. The use of interactive layers on both the top and bottom of the box facilitates cooking of the food in the box in both cooking periods.

In one aspect of the invention there is provided a process for the manufacture of a relatively low fat microwavable french fried potato with desirable textural and taste characteristics. The present invention does not follow the prior art in which reduction of water content is taught but in one aspect teaches that water content should be reduced as little as possible and that water content should be greater than 60%, preferably between about 65 and 80%.

To obtain crispness of the finished product, the invention provides a process containing one step of treating the potato strips in a solution containing starch. It is believed that treating in a starch solution allows a thin concentrated layer of starch molecules to form within the top surface layer of the potato. On frying, the starch molecules become initially gelatinized and on subsequent reheating, as for example in a microwave oven, the starch molecules become dehydrated and form a crisp outer layer. Due to the effectiveness of the starch layer, moisture may be retained in the potato, and the resultant potato strip has high moisture content. Treating in a starch solution means that the starch enters the potato before a first frying step. This is believed to assist in preventing fat from being absorbed by the potato during subsequent frying steps, with the resulting product being relatively low in fat content, high in moisture content, while yielding a crisp final product on microwave heating.

There is also provided a method of cooking a relatively low fat microwavable french fried potato in which potato strips are contained within a box, the box is opened to lie flat and the potato strips are spread on the box and then exposed to microwave energy. The box has a consecutive top panel, side panel and bottom panel, with surrounding flaps. The potato strips are spread across the top panel, side panel and bottom panel for cooking. Preferably a susceptor board covers the top panel, side panel and the bottom panel.

A box for microwave cooking of potato strips includes a top panel, side panel and bottom panel, each of which has a susceptor board closely affixed to it. Thus the box, when opened to lie flat, forms a wide surface on which the potato strips may be placed for cooking.

BRIEF DESCRIPTION OF THE DRAWINGS

There will now be described a preferred embodiment of the invention, with reference to the drawings, by way of illustration, in which like numerals denote like elements and in which:

FIG. 2 is a plan view of an outline of a box according to one aspect of the invention;

FIG. 3 is a section of the box of FIG. 2 in the closed position; and

FIG. 4 is a section of the box of FIG. 2 in the open position.

DETAILED DESCRIPTION OF PREFERRED EMBODIMENTS

Figure 1:
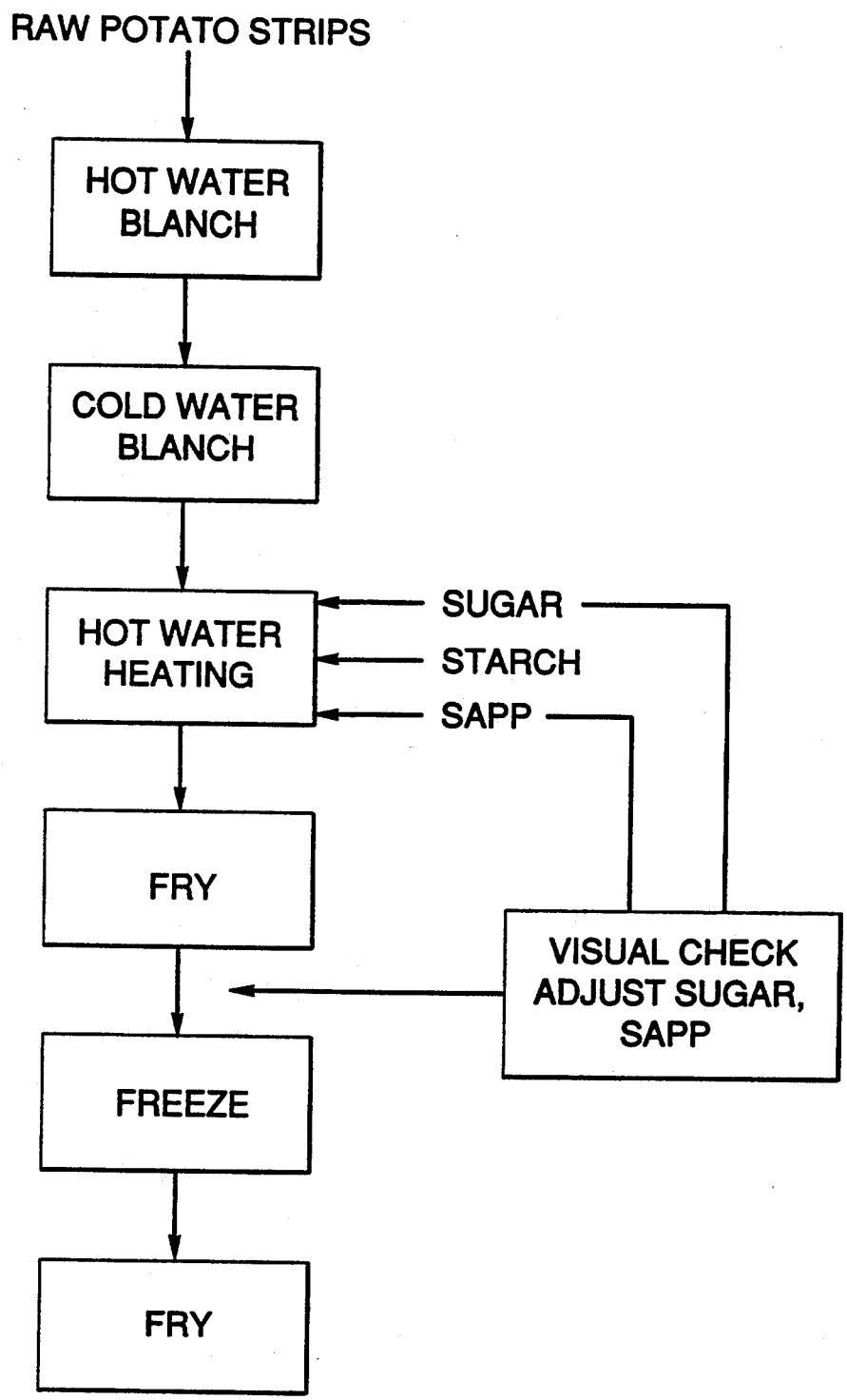
FIG. 1 is a block diagram of a preferred embodiment of a method of preparing french fried potatoes.

The steps of the process of preparing microwavable potato strips are outlined in FIG. 1 to which reference may be made in understanding the process steps. In the preferred method for the preparation of microwavable french fried potatoes from potato strips, raw potato strips of a desirable size are first prepared using known methods, as for example described in the Shanbhag patent. Shoestring potato strips having a cross-sectional dimension of about ¼" and length between 2" and 4" are preferred. The potato strips are first processed by blanching. The blanching procedure preferably takes place in two steps (three steps if you count treating in a hot water solution containing starch as a blanching step), but the first two may be omitted with some deterioration in product appearance. In the first step, the potato strips are blanched in hot water (about 175° F.) for about 7 minutes. The potato strips are then blanched about one minute in cold water (about 95° F.). These two steps tend to remove potato starch and sugars from the outer surface layer of the potato. The potato strips are next treated by being heated about 6 minutes in a hot water solution at about 160° F. This treating step is believed important since the surface colour, surface crispness and fat content depends in large part upon this step. In this treating step, starch is added to the hot water in an amount of about 7-10% by volume of the solution. The starch is preferably high in amylopectin, and may be modified food starch (batch no. BA 5967) available from National Starch & Chemical of Bridgwater, N.J., United States of America. Sugar (about 1% by volume) and sodium acid pyrophosphate (SAPP) (about ½% by volume of the solution) may also be added to the hot water in this treating step to control colour according to known techniques. Colour control may be performed by visual inspection after frying and manual adjustment of the sugar and SAPP content accordingly. Colour control is a known process in the art and is not described further here.

The actual temperature at which the treating step is carried out may be varied, the purpose being to ensure that a sufficient amount of the starch enter the potato strips to form a starch layer in the top surface layer of the potato strips. Clearly, lower temperatures or lower amounts of starch concentration will retard the rate at which starch enters the potato strips and therefore reduce the depth of the starch layer for a given treatment duration, and higher temperatures and higher amounts of starch will increase the rate at which starch enters the potato strips and therefore increase the depth of the starch layer for a given treatment duration. The rates specified have been found satisfactory.

Next the potato strips are parfried a first time in hot oil (45-60 seconds at 375° F.). Temperature and time of frying may be adjusted according to the desired colour characteristics. The finished product should be golden and not brown, not burnt and should be uniform in colour. Excess oil in then shaken off in accordance with known techniques, and the potato strips frozen for a first time. Freezing is a well known art in the preparation of french fried potatoes. The inventor has found that convection cooling at a temperature of −25° F. to −30° F. for about 10 minutes is satisfactory.

The potato strips may then be stored but it is preferable to parfry the potato strips a second time while frozen for a similar time and at a similar temperature as the first parfry step. Excess oil is then removed from the potato strips, the potato strips are then frozen again in a similar way, and the potato strips placed in boxes and stored in the frozen state.

It is important to note that contrary to conventional methods of preparing microwavable french fried potatoes, there is no specific drying step. It will be appreciated that the act of frying and other handling of the potato strips results in some water loss, but it is believed desirable to keep this to a minimum. The potato strips should have a water content of greater than 60% and preferably in the range 65% to 80% after completion of processing. Water content below 50% is believed detrimental to the final product quality.

In one example, using the above mentioned method, a microwavable french fry was produced that had 60% by weight water content, 10% fat, 7% protein, 1.1% ash and 22% carbohydrate. In a second example, using the above mentioned method, a microwavable french fry was produced that, in a 78 g. serving, had 7.4 g. fat, 2.4 g. protein and 6.8 g. carbohydrate. In a third example, using the above mentioned method, a microwavable french fry was produced that had 9.6% fat, 3% protein, 8.6% carbohydrate and 77.4% moisture. The weights given are the weights after processing but before microwaving.

Referring to FIGS. 2, 3 and 4 there is shown a box for cooking the microwave french fried potatoes of the present invention. A box 10 is formed from a blank shown in FIG. 2 and is openable from a first closed position shown in FIG. 3 to a second open position shown in FIG. 4. The blank is preferably made from paperboard of the type described in U.S. Pat. No. 4,590,349.

The box has a top panel 12 having an interior side 14, first, second and third exterior edges 16a, 16b, 16c and a first interior edge 18. The box 10 also has a bottom panel 22 having an interior side 24, fourth, fifth and sixth exterior edges 26a, 26b, 26c and a second interior edge 28. The box 10 also has a side panel 32 having an interior side 34 and opposed edges joined to the first and second interior edges 18 and 28 of the top and bottom panels 12 and 22 respectively. A plurality of flaps 36a, 36b, 36c, 36d, 36e and 36f extend outward from the first, second, third, fourth, fifth and sixth exterior edges 16a, 16b, 16c, 26a, 26b and 26c respectively. Each of the flaps is hinged to the panel from which it extends. The hinged edges to the panels are preferably created by folding the board in known manner. A susceptor board (microwave interactive layer) 38 with an optical density of from 0.017 to 0.032 is disposed and preferably adhered with a suitable adhesive adjacent the interior sides 14, 24 and 34 of the top, bottom and side panels respectively. Susceptor boards are well known in the art and need not be further described here. Suffice to say that they reflect microwave energy and therefore enhance the cooking of the potato strips. While it is preferred that the susceptor board be adhered to the board forming the top, bottom and side panels, it may be formed integrally with the blank. The susceptor board may be perforated to allow oil from the potato strips to drain and be absorbed by the more porous board of the box. While the use of a susceptor board has been found to be advantageous, it will be appreciated that the method of preparing the potato strips for microwave cooking is useful in itself in preparing microwavable potato strips.

Ends 46a and 46b of the flaps 36d and 36f respectively are preferably scoured along lines 48a and 48b respectively and attached along hinge edges 49a and 49b respectively to the side panel 32. Tabs 42a and 42d are respectively hinged to ends of flap 36e, with the hinge being formed by folding the board forming the blank. Tabs 42b and 42c are respectively hinged to ends of flap 36b, with similar hinges. A slot 54 is formed in flap 36e and a complementary tab 52 is formed in flap 36b.

To form the blank shown in FIG. 2 into a box, flaps 36a, 36b and 36c are folded 90° (towards the viewer from the plane of the Figure) with respect to the top panel 12. Tab 42b is adhered to the part B of flap 36b, and tab 42c is adhered to the part C of flap 36b. Flaps 36d, 36d and 36f are folded 90° (towards the viewer from the plane of the Figure) with respect to the bottom panel 22. Tab 42a is adhered to the part A of flap 36d, and tab 42d is adhered to the part D of flap 36f. Each of the tabs 42a, 42b, 42c and 42d are preferably folded inside the parts A, B, C and D respectively. The top panel 12 is then folded in relation to side panel 32 along hinge edge 18, and the bottom panel 22 folded in relation to side panel 32 along hinge edge 28, with the tabs 46a and 46b folding along the scour lines 48a and 48b respectively and folding inside the flaps 36a and 36c respectively. Tab 52 is inserted into slot 54 to hold the box in the closed position shown in FIG. 3. The dimensions of the closed box are preferably about 1¼"×2½"×6" for a box containing about 100 g of potato strips. It should be understood that the box may be used to microwave cook other food products. For larger boxes, the 1¼" wall size should not change greatly, but the other sizes will be changed proportionately. By keeping the height of the wall to about 1¼", air may circulate around the microwaved product to crisp the potato strips naturally, rather than using a susceptor board surrounding the potato strips.

To cook microwave french fries in such a box, the potato strips to be cooked are initially enclosed within the box at least on three sides by the top panel, the side panel and the bottom panel. The box is then opened with the top panel, the side panel and the bottom panel lying flat. The potato strips are then spread on the top panel, the side panel and the bottom panel, and the potato strips exposed to microwave energy. For a 100 g serving, cooking times are preferably 5–5½ minutes (400–600 watt oven) 3½–4½ minutes (600–800 watt oven) and 2–2½ minutes (800+ watt oven). After cooking the potato strips should be allowed to sit for a minute or two. This allows for crisping. Then the box should be closed and shaken to separate any potato strips that may have stuck to each other. The french fried potatoes are now ready for serving.

For packing potato strips in the box described above, at least one panel of the box is initially laid flat, and potato strips placed on at least one of the panels. The box is then closed. It is preferred that the potato strips are oriented within the box to be substantially parallel to each other. This may be achieved by placing the potato strips on a conveyor belt by any known method, for example by dropping them between parallel plates from a hopper, moving the potato strips along the conveyor belt between a plurality of parallel barriers, where the distance between the barriers is less than the width of most of the potato strips (1½ or less for 2" potato strips—about the equal to the width of the box), and then dropping the potato strips into the boxes, which are ideally moving along a second conveyor below the first conveyor. The barriers will force the potato strips into substantial parallel alignment.

Preferably, the box includes at least one susceptor board at least loosely affixed within the box to each of the top panel, the side panel and the bottom panel of the box, and closing the box includes simultaneously wrapping the potato strips within the susceptor board with the susceptor board enclosing the potato strips at least on three sides.

There should be placed on the box indicia to instruct a purchaser of the potato strips to expose the potato strips to microwave energy in accordance with the cooking times and instructions noted above.

A person skilled in the art could make immaterial modifications to the invention described and claimed in this patent without departing from the essence of the invention.

I claim:

1. A method for the preparation of microwavable french fried potatoes from potato strips, the potato strips having a top surface layer, the method comprising the steps of:
   treating the potato strips in a hot water solution containing starch to form a starch layer in the top surface layer of the potato strips;
   parfrying the potato strips a first time in hot oil;
   freezing the potato strips for a first time;
   processing the potato strips no more than so that after processing, the potato strips contain at least 60% by weight of water; and
   storing the potato strips.

2. The method of claim 1 further including, after freezing the potato strips for a first time:
   parfrying the potato strips a second time in hot oil; and
   freezing the potato strips for a second time.

3. The method of claim 2 further comprising drying the potato strips no more than so that after processing, the potato strips contain at least 60% by weight of water.

4. A method for the preparation of microwavable french fried potatoes from potato strips, the potato strips having a top surface layer, the method consisting of the steps of:
   blanching the potato strips in hot water one or more times;
   treating the potato strips in a hot water solution containing starch to form a starch layer in the top surface layer of the potato strips;
   parfrying the potato strips;
   processing the potato strips no more than so that after processing, the potato strips contain at least 60% by weight of water; and
   subsequently freezing them one or more times.

5. Microwavable potato strips prepared by the process of claim 1.

6. A method of cooking potato strips using a box having a top panel, side panel and a bottom panel joined side by side, the potato strips being initially enclosed at least on three sides by the top panel, the side panel and the bottom panel, the method comprising the steps of:
   opening the box with the top panel, the side panel and the bottom panel lying flat;
   spreading the potato strips on the top panel, the side panel and the bottom panel; and
   exposing the potato strips to microwave energy.

7. The method of claim 6 in which the potato strips have been prepared by the method of claim 2.

8. The method of claim 6 in which each of the top panel, the side panel and the bottom panel is cover by a susceptor board and the potato strips are spread on the susceptor board.

9. The method of claim 8 in which the susceptor board is affixed to the top panel, the side panel and the bottom panel.

* * * * *

UNITED STATES PATENT AND TRADEMARK OFFICE
CERTIFICATE OF CORRECTION

PATENT NO. : 5,328,704
DATED     : July 12, 1994
INVENTOR(S): Avron Ritch

Page 1 of 3

It is certified that error appears in the above-indentified patent and that said Letters Patent is hereby corrected as shown below:   On the title page: Item [56]

"FOREIGN PATENT DOCUMENTS"

| Document | Date | Country | Class | Subclass |
|---|---|---|---|---|
| 2,078,081 | 01/1982 | U.K. | | |
| 1,151,945 | 08/1983 | Canada | | |
| WO 91/12732 | 09/1991 | International | | |
| 1 455 677 | 11/1976 | England | | |
| EP 342059 | 11/1989 | European Pat. Off. | | |

"OTHER ART"

Metallizing for the microwave, Food & Drug Packaging, August 1987, p. 11-13 by Ken Adams

UNITED STATES PATENT AND TRADEMARK OFFICE
CERTIFICATE OF CORRECTION

PATENT NO. : 5,328,704          Page 2 of 3
DATED : July 12, 1994
INVENTOR(S) : Avron Ritch It is certified that error appears in the above-indentified patent and that said Letters Patent is hereby corrected as shown below:

On the title page: ITEM [56] Reference Cited
"U.S. PATENT DOCUMENTS"

| Document Number | Date | Name | Class | Subclass |
|---|---|---|---|---|
| 2,997,566 | Aug. 22/61 | S.C. Pierce et al | | |
| 4,109,020 | Aug. 22/78 | Gorfien et al | 426 | 241 |
| 4,267,420 | May 12/81 | Brastad | 219 | 10.55E |
| 4,297,377 | Oct. 27/81 | Harney et al | 426 | 438 |
| 4,456,624 | June 26/84 | Glantz et al | 426 | 96 |
| 4,580,024 | Apr. 1/86 | Thomas | 219 | 10.55E |
| 4,590,080 | May 20/86 | Pinegar | 426 | 441 |
| 4,590,349 | May 20/86 | Brown et al | 219 | 10.55E |
| 4,641,005 | Feb. 3/87 | Sieferth | 219 | 10.55E |
| 4,676,857 | June 30/87 | Scharr et al | 156 | 233 |
| 4,678,882 | July 7/87 | Bohrer et al | 219 | 10.55E |
| 4,735,513 | Apr. 5/88 | Watkins et al | 383 | 116 |
| 4,742,203 | May 3/88 | Brown et al | 219 | 10.55E |

UNITED STATES PATENT AND TRADEMARK OFFICE
CERTIFICATE OF CORRECTION

PATENT NO. : 5,328,704  
DATED : July 12, 1994  
INVENTOR(S) : Avron Ritch

Page 3 of 3

It is certified that error appears in the above-indentified patent and that said Letters Patent is hereby corrected as shown below:

```
4,751,093    June 14/88    Hong et al       426    438
4,761,294    Aug. 2/88     Hamann et al     426    438
4,764,390    Aug. 16/88    Zukerman et al   426    438
4,878,765    Nov. 7/89     Watkins et al    383    116
4,931,296    June 5/90     Shanbhag et al   426    243
4,943,439    July 24/90    Andreas et al    426    107
5,009,904    Apr. 23/91    Saslaw et al     426    243
4,551,340    Nov. 5/85     El-Hag et al     426    437
4,608,262    Aug. 26/86    Galland          426    243
5,059,435    Oct. 22/91    Sloan et al      426    102
```

Signed and Sealed this

Twenty-ninth Day of August, 1995

Attest:

BRUCE LEHMAN

*Attesting Officer*   *Commissioner of Patents and Trademarks*